Sept. 19, 1933.                E. W. DICHMAN                1,927,309
                                  AIRCRAFT
                             Filed Sept. 23, 1931

Inventor
Ernest W. Dichman
By Maréchal & Noe
Attorney

Patented Sept. 19, 1933

1,927,309

UNITED STATES PATENT OFFICE 1,927,309

AIRCRAFT

Ernest W. Dichman, Farmingdale, N. Y.

Application September 23, 1931
Serial No. 564,550

1 Claim. (Cl. 244—29)

This invention relates to aircraft, and more particularly to means for effecting the lateral control of airplanes and the like.

One object of the invention is the provision of a lateral control for aircraft, embodying a control aerofoil which is fixed at a laterally inclined angle to a control surface such as an aileron, so as to be presented endwise in normal forward flight, for automatically operating the control surface or aileron and automatically stabilize the aircraft.

Another object of the invention is the provision, in a control system of the character described, of a control aerofoil which is spaced vertically with relation to the control surface or aileron on which it is fixed so as to provide for efficient operation.

Other objects and advantages of the invention will be apparent from the following description, the appended claim and the accompanying drawing in which Fig. 1 is a front view of an airplane embodying the present invention;

Figure 4:
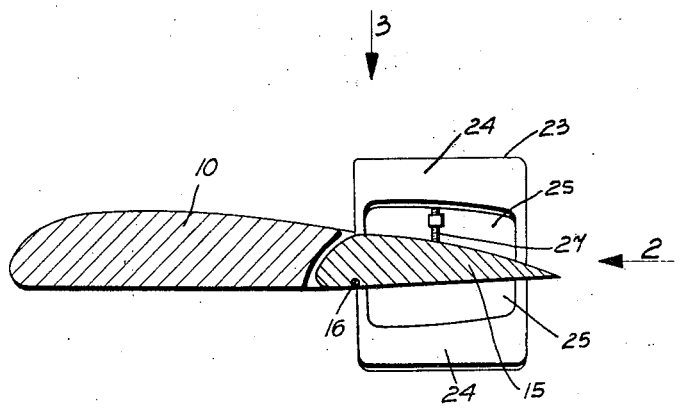
Fig. 4 is a section on the line 4—4 of Fig. 2.

Referring more particularly to the drawing, 10 designates one of the wings or sustaining surfaces of an aircraft, having a fuselage 11, propeller 12 and landing gear 13. These may be of any suitable character. As herein shown, the aircraft is of the monoplane type.

Lateral control devices in the form of ailerons 15 are provided at each side of the airplane, these ailerons being preferably recessed in the rear outer portion of the sustaining surfaces and pivotally supported at or near their leading edges as indicated at 16 for movement about an axis that extends transversely of the aircraft, that is, in a generally outward direction.

Suitable means, such as the manually operable wires 20 connected to the control horns 21 are provided for manually controlling the position of the ailerons during normal flight, it being understood that the aileron on the right side of the airplane may be depressed while the left hand aileron is raised or vice versa.

In order to effect an automatic control of the position of the ailerons during side slip or sidewise movements of the airplane that may occur, for example, when the airplane is tilted laterally at a substantial angle, the ailerons or lateral control surfaces are controlled by means of an aerofoil or aerofoils arranged at a lateral inclination so as to present a substantial area laterally during sidewise movements of the airplane. This aerofoil offers no resistance to forward flight as it is presented endwise as viewed from the front, but it is acted on by the air during side slip movements creating a force having a substantial vertical component. The control aerofoil is fixed directly to the lateral control surface so as to automatically move the latter if the manual control lever is free. If the manual control lever is held by the pilot the force created automatically by the aerofoil will direct or control the movements given to the control lever. The lateral control surface or aileron on the low side of the airplane is thus moved down automatically to increase the lift on the low side of the airplane and thus restore the airplane to its normal horizontal attitude.

Figure 2:
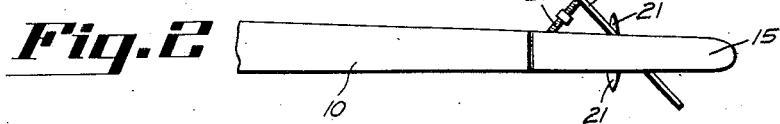
Fig. 2 is a rear elevation of the end portions of one of the sustaining surfaces.
Figure 1:
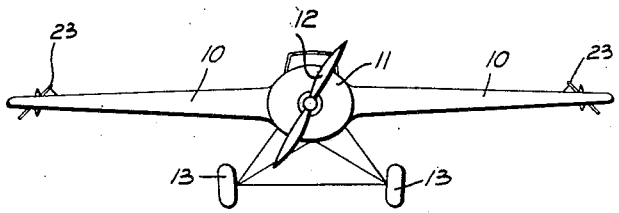

The control aerofoils of the present application, which is a continuation in part of my prior application for Letters Patent Serial No. 411,785 filed December 5, 1929, are designated 23. Both are of course similar in construction so only one of them will be described. As indicated in Fig. 2 the aerofoil is presented endwise in normal forward flight so as to offer substantially no resistance or obstruction to forward movement. It is downwardly and outwardly inclined, however, and is positioned vertically with respect to the aileron 15, preferably centrally of the aileron as indicated in Fig. 2, so that during side slip or lateral movements of the aerofoil the downward thrust exerted by the air on the aerofoil tilts the aileron about the aileron axis so as to increase the aileron lift on the lower side of the ship or decrease the lift of the aileron on the higher side.

Figure 3:
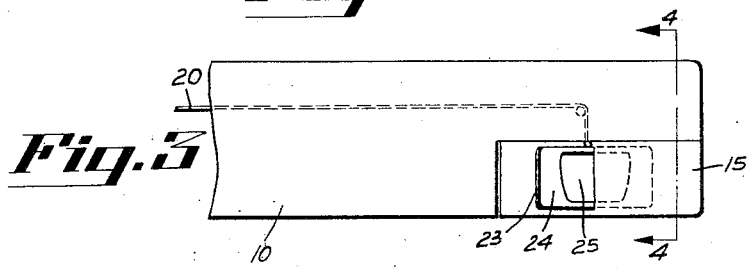
Fig. 3 is a top plan view corresponding with Fig. 2.

As shown in Figs. 3 and 4, the aerofoil is provided between vertical planes containing the front and rear edges of the aileron, and is so arranged as to provide a main effective surface area 24 that is spaced a substantial distance vertically with respect to the aileron in order that an air space 25 is provided between the aileron and the main effective surface of the aerofoil. This permits the passage of air laterally of the airplane during side slip movements, and along the surface of the aileron. This passage of air would otherwise be interfered with, and there would be a blocking tendency and an inefficient action if the aerofoil extended up or down and intersected the aileron surface. However, with the air space 25 provided, the air can flow along the upper or lower side of the aileron and impinge against the inclined aerofoil 23 in an efficient manner so that the parts need not be of unusual size and so that a normal efficient operation will result.

The control aerofoil 23 is shown in the drawing in two portions one of which is above the aileron while the other is below. Either the upper or the lower portion may be used without the other as it is unnecessary for the control aerofoil to be located on both sides of the surface it controls.

It is also contemplated that the control aerofoils may be adjustable in their lateral inclination angle so as to increase or decrease the thrust they exert on the aileron. Thus the joints of connection of the aerofoils to the aileron may be hinged to provide for relative movement, an adjustable length screw 27 or the like serving to hold the aerofoil at a desired lateral angle of inclination.

While the form of apparatus herein described constitutes a preferred embodiment of the invention, it is to be understood that the invention is not limited to this precise form of apparatus, and that changes may be made therein without departing from the scope of the invention which is defined in the appended claim.

What is claimed is:

In an aircraft, a lateral control surface movable about an axis extending transversely of the aircraft, and a laterally inclined aerofoil for automatically operating said surface to correct for side slip, said aerofoil being fixed on said surface so as to be presented endwise in normal forward flight, and vertically positioned with relation to said surface within the longitudinal confines thereof and having its main effective area spaced vertically with respect to said surface so as to leave an open space between said main effective area and said surface for the lateral passage of air.

ERNEST W. DICHMAN.